United States Patent
Ogawa et al.

(10) Patent No.: US 9,034,215 B2
(45) Date of Patent: May 19, 2015

(54) NOBLE METAL FINE PARTICLE, METHOD FOR WITHDRAWING NOBLE METAL FINE PARTICLES, AND METHOD FOR PRODUCING NOBLE METAL FINE PARTICLE DISPERSED MATERIAL USING WITHDRAWN NOBLE METAL FINE PARTICLES

(75) Inventors: Ryohei Ogawa, Tokyo (JP); Kiyoshi Miyashita, Tokyo (JP); Masamichi Kezuka, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 255 days.

(21) Appl. No.: 13/701,861

(22) PCT Filed: May 19, 2011

(86) PCT No.: PCT/JP2011/002793
§ 371 (c)(1),
(2), (4) Date: Dec. 4, 2012

(87) PCT Pub. No.: WO2011/155134
PCT Pub. Date: Dec. 15, 2011

(65) Prior Publication Data
US 2013/0069017 A1    Mar. 21, 2013

(30) Foreign Application Priority Data
Jun. 11, 2010 (JP) ................. 2010-133571

(51) Int. Cl.
| | | |
|---|---|---|
| H01B 1/02 | (2006.01) | |
| B01F 3/00 | (2006.01) | |
| C09D 189/00 | (2006.01) | |
| H01B 1/22 | (2006.01) | |
| B82Y 30/00 | (2011.01) | |
| B22F 1/00 | (2006.01) | |
| B22F 1/02 | (2006.01) | |

(52) U.S. Cl.
CPC ............... *C09D 189/00* (2013.01); *H01B 1/22* (2013.01); *B82Y 30/00* (2013.01); *H01B 1/02* (2013.01); *Y10S 977/773* (2013.01); *Y10S 977/81* (2013.01); *Y10S 977/895* (2013.01); *B22F 1/0022* (2013.01); *B22F 1/0062* (2013.01); *B22F 1/02* (2013.01)

(58) Field of Classification Search
None
See application file for complete search history.

(56) References Cited

U.S. PATENT DOCUMENTS

| | | |
|---|---|---|
| 2009/0321689 A1 | 12/2009 | Harada et al. |
| 2010/0113647 A1 | 5/2010 | Harada et al. |
| 2010/0143183 A1 | 6/2010 | Martinez Martinez et al. |

FOREIGN PATENT DOCUMENTS

| | | |
|---|---|---|
| JP | 2007-039765 | 2/2007 |
| JP | 2007039765 A * | 2/2007 |
| JP | 2008-050691 | 3/2008 |
| JP | 2010-513718 | 4/2010 |
| WO | 2006/053225 | 5/2006 |

OTHER PUBLICATIONS

Wilson, Ian D. Poole, Colin F. (2009). Handbook of Methods and Instrumentation in Separation Science, vol. 1—Bovine Serum Albumin as Mobile-Phase Modifier. Elsevier. Online version available at http://app.knovel.com/hotlink/pdf/id:kt00BYY9L1/handbook-methods-instrumentation/bovine-serum-albumin).*

* cited by examiner

*Primary Examiner* — Harold Pyon
*Assistant Examiner* — Jaison Thomas
(74) *Attorney, Agent, or Firm* — Hamre, Schumann, Mueller & Larson, P.C.

(57) ABSTRACT

The present invention provides a noble metal fine particle with a protein adsorbed thereon, including a noble metal fine particle, and a protein adsorbed on a surface of the noble metal fine particle. The protein has an isoelectric point in a range of pH 4.0 to 7.5. An amount of the protein adsorbed is in a range of 3 to 55.1 wt % with respect to a total weight of the noble metal fine particle and the protein. The noble metal fine particle with a protein adsorbed thereon according to the present invention has excellent redispersibility. That is, by adjusting the pH of a noble metal fine particle dispersed liquid to the isoelectric point of the proteins and allowing the noble metal fine particles to be aggregated without adding a degrading enzyme that degrades the proteins to the noble metal fine particle dispersed liquid, it is possible to allow the noble metal fine particles with proteins adsorbed thereon withdrawn from the noble metal fine particle dispersed liquid to have an average particle diameter that is not increased significantly even after they are redispersed in another dispersion medium.

3 Claims, No Drawings

NOBLE METAL FINE PARTICLE, METHOD FOR WITHDRAWING NOBLE METAL FINE PARTICLES, AND METHOD FOR PRODUCING NOBLE METAL FINE PARTICLE DISPERSED MATERIAL USING WITHDRAWN NOBLE METAL FINE PARTICLES

TECHNICAL FIELD

The present invention relates to a noble metal fine particle. More specifically, the present invention relates to a noble metal fine particle with a protective colloid adsorbed thereon in order to be dispersed stably in a dispersion medium such as a solvent, and relates to a method for withdrawing noble metal fine particles from a noble metal fine particle dispersed material in which the noble metal fine particles are dispersed. Furthermore, the present invention relates to a method for producing a noble metal fine particle dispersed material by redispersing the withdrawn noble metal fine particles in a dispersion medium.

BACKGROUND ART

There is known a noble metal fine particle dispersed liquid in which noble metal fine particles are dispersed stably with protective colloids. When the noble metal fine particles are taken out from the noble metal fine particle dispersed liquid and used for, for example, producing a conductive material, the noble metal fine particles need to be withdrawn effectively. Usually, when noble metal fine particles need to be withdrawn effectively from a noble metal fine particle dispersed liquid containing protective colloids, a protective colloid remover is added to this noble metal fine particle dispersed liquid to remove the protective colloids to some extent, and a flocculant further is added thereto to aggregate the noble metal fine particles. The following materials can be mentioned as examples of the protective colloid, the protective colloid remover, and the flocculant.

(Protective Colloid)
(1) Protein protective colloid: gelatin, gum arabic, casein, a casein compound
(2) Natural polymer: starch, dextrin, agar, sodium alginate
(3) Cellulose protective colloid: hydroxyethyl cellulose, carboxymethyl cellulose, methyl cellulose, ethyl cellulose, modified cellulose
(4) Synthetic polymer protective colloid such as the following.
Vinyl protective colloid: polyvinyl alcohol, polyvinyl pyrrolidone
Acrylic protective colloid: sodium polyacrylate, ammonium polyacrylate
Others: polyethylene glycol, polypropylene glycol
(Protective Colloid Remover)
(1) Protein degraing enzyme (such as serine protease)
(2) Natural polymer degrading enzyme (such as amylase that is a starch degrading enzyme)
(3) Cellulose degrading enzyme (such as cellulase)
(4) Organic solvent (such as formamide), acid, alkali
The numbers indicating the above-mentioned protective colloid removers correspond respectively to the numbers indicating the protective colloids to be removed (for example, the organic solvent listed in (4) is used as the remover for the synthetic polymer protective colloid).
(Flocculant for Aggregating Noble Metal Fine Particles)
(1) Anionic flocculant (such as a product obtained by partial hydrolysis of polyacrylamide)
(2) Cationic flocculant (such as polyacrylamide, and dimethylaminoethyl methacrylate)
(3) Amphoteric flocculant (such as an alkylamino(meth)acrylate quaternary salt-acrylamide-acrylate copolymer)
There is also known a method in which an acid is added as a flocculant and the pH thereof is adjusted to accelerate the aggregation.
Noble metal fine particles withdrawn from a noble metal fine particle dispersed liquid and dried into a powdery state are redispersed in a dispersion medium, such as a solvent and a paste, and the resultant can be used as a coating material, a conductive paste, etc.
However, in the case of the noble metal fine particle powder withdrawn after the protective colloids have been removed to some extent, the noble metal fine particles have a lower dispersibility (redispersibility) at the time when being redispersed in a dispersion medium such as a solvent. Moreover, the withdrawing method in which a protective colloid remover is added to a noble metal fine particle dispersed liquid and a flocculant further is added thereto requires complicated work.
There is also known a withdrawing method in which a complexing agent is added to a noble metal fine particle dispersed liquid. However, when a noble metal fine particle powder is withdrawn by this method, it is likely that the adsorbed protective colloids are desorbed and the effect of enhancing the redispersibility by the protective colloids is lowered. Moreover, in this method, the added complexing agent is an impurity that worsens the redispersibility.
A conventional method for withdrawing noble metal fine particles from a noble metal fine particle dispersed liquid containing protective colloids is disclosed in Patent Literature 1, for example.

CITATION LIST

Patent Literature

PTL 1: JP 2007-039765 A

SUMMARY OF INVENTION

Technical Problem

The present invention is intended to provide a noble metal fine particle having excellent redispersibility after being withdrawn. The present invention is also intended to provide a method for withdrawing noble metal fine particles from a noble metal fine particle dispersed liquid with simple work. Furthermore, the present invention is intended to produce a noble metal fine particle dispersed material using withdrawn noble metal fine particles.

Solution to Problem

The present invention provides a noble metal fine particle with a protein adsorbed thereon, including a noble metal fine particle, and a protein adsorbed on a surface of the noble metal fine particle. The protein has an isoelectric point in a range of pH 4.0 to 7.5. An amount of the protein adsorbed is in a range of 3 to 55.1 wt % with respect to a total weight of the noble metal fine particle and the protein.
The present invention also provides a method for withdrawing noble metal fine particles with proteins adsorbed thereon, the method comprising the steps of
adjusting pH of a noble metal fine particle dispersed liquid that contains a first dispersion medium that is a liquid, and noble metal fine particles with proteins adsorbed thereon each comprising a noble metal fine particle and a protein adsorbed on a surface of the noble metal fine particle, to an isoelectric point of the protein so that the noble metal fine particles with proteins adsorbed thereon are aggregated in the first dispersion medium, wherein the isoelectric point of the protein is in a range of pH 4.0 to 7.5, and an amount of the protein adsorbed is in a range of 3 to 55.1 wt % with respect to a total weight of the noble metal fine particle and the protein, and the liquid contains no degrading enzyme that degrades the protein; and withdrawing the aggregated noble metal fine particles from the first dispersion medium by a solid-liquid separation operation.

Furthermore, the present invention provides a method for producing a noble metal fine particle dispersed material containing noble metal fine particles with proteins adsorbed thereon, the method comprising the steps of:

withdrawing noble metal fine particles with proteins adsorbed thereon by the above-mentioned method; and dispersing the withdrawn noble metal fine particles in a second dispersion medium.

Furthermore, the present invention provides a method for producing a noble metal fine particle dispersed material containing noble metal fine particles with proteins adsorbed thereon, the method comprising the steps of:

adjusting pH of a noble metal fine particle dispersed liquid that contains a first dispersion medium that is a liquid, and noble metal fine particles with proteins adsorbed thereon each comprising a noble metal fine particle and a protein adsorbed on a surface of the noble metal fine particle, to an isoelectric point of the protein so that the noble metal fine particles are aggregated in the first dispersion medium, wherein the isoelectric point of the protein is in a range of pH 4.0 to 7.5, and an amount of the protein adsorbed is in a range of 3 to 55.1 wt % with respect to a total weight of the noble metal fine particle and the protein, and the noble metal fine particles with proteins adsorbed thereon have an average particle diameter of R, and the liquid contains no degrading enzyme that degrades the protein;

withdrawing the aggregated noble metal fine particles from the first dispersion medium by a solid-liquid separation operation; and dispersing the withdrawn noble metal fine particles in a second dispersion medium so as to prepare a noble metal fine particle dispersed material in which noble metal fine particles with proteins adsorbed thereon having an average particle diameter of 0.9 R or more and 1.1 R or less are dispersed.

Advantageous Effects of Invention

The noble metal fine particle according to the present invention exhibit satisfactory redispersibility when withdrawn from a noble metal fine particle dispersed liquid and dispersed in another dispersion medium. The withdrawn noble metal fine particle according to the present invention can be used suitably as a raw material for a coating material and a conductive paste, etc. The method for withdrawing noble metal fine particles according to the present invention is a method for withdrawing noble metal fine particles without adding a protective colloid remover, and it can be performed with simple work.

DESCRIPTION OF EMBODIMENTS

Preferably, the protein is casein in the present invention. Use of casein as a protective colloid makes it possible to obtain a noble metal fine particle with a protein adsorbed thereon that exhibits particularly excellent redispersibility.

Eight elements of gold (Au), silver (Ag), platinum (Pt), palladium (Pd), rhodium (Rh), iridium (Ir), ruthenium (Ru), and osmium (Os) are defined as noble metals. In the present invention, it is preferable that the noble metal fine particle is composed of at least one noble metal selected from Pt, Pd, Au, Ag, Ru, and Rh, and it is particularly preferable that the noble metal fine particle is composed of at least one noble metal selected from Au, Ag, and Pt.

Preferably, the noble metal fine particles with proteins adsorbed thereon have an average particle diameter in a range of 1 nm to 100 nm in the present invention. An average particle diameter in this range allows the noble metal fine particles to exhibit excellent redispersibility.

More preferably, the noble metal fine particles with proteins adsorbed thereon have an average particle diameter in a range of 1 nm to 50 nm.

The noble metal fine particle with a protein adsorbed thereon according to the present invention can be used as a noble metal fine particle dispersed material obtained by dispersing the noble metal fine particle with a protein adsorbed thereon in a dispersion medium. The noble metal fine particle dispersed material is, for example, a noble metal fine particle dispersed liquid containing the noble metal fine particle with a protein adsorbed thereon according to the present invention and a dispersion medium that is a liquid. As the liquid, a polar organic solvent is preferred.

Another example of the noble metal fine particle dispersed material is a noble metal fine particle dispersed paste containing the noble metal fine particle with a protein adsorbed thereon according to the present invention and a dispersion medium that is a paste. The word "paste" is a term indicating a solid material having flowability and viscosity.

Examples of the protein having an isoelectric point in a range of pH 4.0 to 7.5 include haptogloblin (4.1), gelatin (4.0 to 5.0), casein (4.6), albumin (4.7 to 4.9), collagen (4.9 to 5.2), actin (5.0), insulin (5.4), fibrinogen (5.8), γ1-globulin (5.8), hemoglobin (7.2), and γ2-globulin (7.4).

Usually, a noble metal salt solution (such as a chlorauric acid solution) to be used as the raw material for the noble metal fine particle is acid and has a pH of about 3.0. When a noble metal fine particle dispersed liquid is prepared by adding proteins having an isoelectric point close to the pH of the noble metal salt solution to the noble metal salt solution, the noble metal fine particles are aggregated in some cases. When proteins having an isoelectric point significantly lower than the pH of the noble metal salt solution (proteins having an isoelectric point in a highly acidic region) are used, the noble metal fine particles are degraded during an aggregation treatment in the highly acidic region, and uniform adsorption of the proteins may be hindered. That is, when proteins having an excessively low isoelectric point are used, the effect of enhancing the redispersibility of the noble metal fine particles by the proteins may be lowered. On the other hand, when proteins having an isoelectric point significantly higher than the isoelectric point of the noble metal salt solution (proteins having an isoelectric point in an alkali region) are used, the proteins may be partially desorbed from the noble metal fine particles during an aggregation treatment in the alkali region. That is, the effect of enhancing the redispersibility of the noble metal fine particles by the proteins may be lowered also when proteins having an excessively high isoelectric point are used. Therefore, it is appropriate that the protein has an isoelectric point of pH 4.0 to 7.5.

When the amount of the protein adsorbed on the noble metal fine particle is less than 3 wt % with respect to a total weight of the noble metal fine particle and the protein and when it exceeds 55.1 wt % with respect to the total weight of the noble metal fine particle and the protein, the noble metal fine particles with proteins adsorbed thereon after being redispersed have an increased average particle diameter and lower redispersibility. Conceivably, when the amount of the protein adsorbed is less than 3 wt %, the amount of the protein acting as a protective colloid is insufficient, and thus the noble metal fine particles are aggregated easily. On the other hand, the reason is unclear in detail why the redispersibility is lowered when the amount of the protein adsorbed exceeds 55.1 wt %. Possibly, a condition that causes an excess amount of a protein to be adsorbed on the noble metal fine particle during production (a condition in which a protein is added excessively) is adopted, the particle diameter of the noble metal fine particles and the amount of the proteins adsorbed vary due to the effect of protein, and this lowers the redispersibility (for example, there is a possibility that when a reducing reaction of the noble metal fine particles was carried out in a dispersion medium containing an excess amount of proteins, the proteins hinder the reducing reaction and the adsorption of the proteins become nonuniform due to an increase in the viscosity of the dispersion medium, and accordingly the above-mentioned variation occurs.

In the case of forming noble metal fine particle as a colloid by a reducing process, a noble metal fine particle dispersed liquid can be obtained by adding a protein to a dispersion medium in advance (that is, before a reducing reaction is carried out). It can be obtained also by adding a protein to a noble metal fine particle dispersed liquid (dispersion medium) after noble metal fine particle is formed by a reducing process.

In the withdrawing method according to the present invention, the pH of the noble metal fine particle dispersed liquid is adjusted to the isoelectric point of the proteins first. The pH adjustment may be performed by adding a pH adjustor, which typically is an acid, to the noble metal fine particle dispersed liquid. The noble metal fine particles can be aggregated in the noble metal fine particle dispersed liquid even when the pH of the noble metal fine particle dispersed liquid fails to completely match the isoelectric point and is somewhat different therefrom.

By a solid-liquid separation operation, the aggregated noble metal fine particles are separated from the dispersion medium (a first dispersion medium) that is a liquid. The solid-liquid separation operation is not particularly limited, and a known technique, such as centrifugal separation and filtration, may be used. From the view point of the time required for the solid-liquid separation and the withdrawing ratio of the noble metal fine particles, the centrifugal separation is preferred.

In the withdrawing method according to the present invention, the noble metal fine particles are aggregated without adding a degrading enzyme that degrades the protein functioning as a protective colloid remover to the noble metal fine particle dispersed liquid. Thus, the amount of the proteins adsorbed on the aggregated and withdrawn noble metal fine particles is substantially the same as the amount of the proteins adsorbed on the noble metal fine particles before the noble metal fine particles are withdrawn.

By dispersing the withdrawn noble metal fine particles in a new dispersion medium (a second dispersion medium), a noble metal fine particle dispersed material containing the withdrawn noble metal fine particles can be obtained. The second dispersion medium is selected in accordance with the purpose of use. For example, it is a liquid or a paste. When it is a liquid, it may be the same type of solvent as the first dispersion medium, or a different type of solvent from the first dispersion medium.

In the present invention, the excellent redispersibility of the noble metal fine particles allows the average particle diameter of the noble metal fine particles dispersed in the second dispersion medium to be an approximate value to the average particle diameter of the noble metal fine particles at the time when they used to be dispersed in the first dispersion medium. Specifically, the average particle diameter of the noble metal fine particles in the second dispersion medium can be 0.9 R to 1.1 R with respect to an average particle diameter R of the noble metal fine particles in the first dispersion medium. Here, the average particle diameter is a value measured on the noble metal fine particles in the state in which proteins are adsorbed thereon.

EXAMPLES

Example 1

3.8 mg of casein (produced by Kanto Chemical Co., Inc.) to serve as protective colloids were added to 5.2 ml of 3-amino-1-propanol (produced by Wako Pure Chemical Industries, Ltd.) diluted to 5.52 mol/l and stirred for 15 minutes to dissolve the casein. Further, 0.8 ml of a 0.2 mol/l chlorauric acid solution (produced by Mitsuwa Chemicals Co., Ltd.) was added thereto and stirred for 15 minutes. Subsequently, a reducing agent solution prepared by dissolving 4.7 mg of dimethylamine borane (produced by Wako Pure Chemical Industries, Ltd.) and 158 mg of sodium ascorbate (produced by Wako Pure Chemical Industries, Ltd.) in 2 ml of pure water was added thereto, and the resultant mixture was heated to 80° C. Then, the mixture was stirred for 60 minutes while the temperature was maintained. Thereby, a gold fine particle dispersed liquid was prepared. The molar ratio of the casein to the gold was 0.010 when calculated from their inputs.

Example 2

A gold fine particle dispersed liquid was prepared in the same manner as in Example 1, except that the amount of the casein added was changed to 6.4 mg. The molar ratio of the casein to the gold was 0.017 when calculated from their inputs.

Example 3

A gold particle dispersed liquid was prepared in the same manner as in Example 1, except that the amount of the casein added was changed to 19.2 mg. The molar ratio of the casein to the gold was 0.051 when calculated from their inputs.

Example 4

A gold fine particle dispersed liquid was prepared in the same manner as in Example 1, except that the amount of the casein added was changed to 38.4 mg. The molar ratio of the casein to the gold was 0.102 when calculated from their inputs.

Example 5

A gold fine particle dispersed liquid was prepared in the same manner as in Example 1, except that the amount of the casein added was changed to 57.6 mg. The molar ratio of the casein to the gold was 0.153 when calculated from their inputs.

Example 6

A gold fine particle dispersed liquid was prepared in the same manner as in Example 1, except that the amount of the casein added was changed to 96.0 mg. The molar ratio of the casein to the gold was 0.254 when calculated from their inputs.

Example 7

Sodium carbonate (produced by Wako Pure Chemical Industries, Ltd.) was dissolved in pure water to prepare 11.7 ml of a 0.0078 mol/l sodium carbonate aqueous solution. Further, 75 mg of casein (produced by Kanto Chemical Co., Inc.) to serve as protective colloids were added thereto and dissolved. Subsequently, a reducing agent solution prepared by dissolving 0.9 mg of dimethylamine borane in 2 ml of pure water was added thereto and stirred for a few minutes. Next, 0.64 ml of a silver raw material solution prepared by mixing 15 ml of a 0.05 mol/l silver nitrate aqueous solution (produced by Kanto Chemical Co., Inc.) with 1 g of 3-amino-1-propanol was added thereto. The resultant mixture was heated to 80° C., and then the mixture was stirred for 60 minutes while the temperature was maintained. Thereby, a silver fine particle dispersed liquid was prepared. The molar ratio of the casein to the silver was 0.010 when calculated from their inputs.

Example 8

Chloroplatinic acid (produced by Mitsuwa Chemicals Co., Ltd.) was dissolved in pure water to prepare 65 ml of a 0.15 mol/l chloroplatinic acid aqueous solution. The chloroplatinic acid aqueous solution was heated to 80° C. Subsequently, a solution obtained by dissolving 30 mg of casein in 10 ml of an ammonia solution (produced by Wako Pure Chemical Industries, Ltd.) in which the concentration of ammonia with respect to the entire solution was adjusted to 2 mass % was added to the chloroplatinic acid aqueous solution while the temperature was maintained. Further, a reducing agent solution prepared by dissolving 30 mg of sodium borohydride (produced by Kishida Chemical Co., Ltd.) in 5 ml of pure water was added thereto and stirred for 60 minutes. Thereby, a platinum fine particle dispersed liquid was prepared. The molar ratio of the casein to the platinum was 0.130 when calculated from their inputs.

Comparative Example 1

A gold fine particle dispersed liquid was prepared in the same manner as in Example 1, except that the amount of the casein added was changed to 1.9 mg. The molar ratio of the casein to the gold was 0.005 when calculated from their inputs.

Comparative Example 2

A gold fine particle dispersed liquid was prepared in the same manner as in Example 1, except that the amount of the casein added was changed to 3.2 mg. The molar ratio of the casein to the gold was 0.008 when calculated from their inputs.

Comparative Example 3

A gold fine particle dispersed liquid was prepared in the same manner as in Example 1, except that the amount of the casein added was changed to 115.2 mg. The molar ratio of the casein to the gold was 0.305 when calculated from their inputs.

Comparative Example 4

A gold fine particle dispersed liquid was prepared in the same manner as in Example 1, except that the amount of the casein added was changed to 153.6 mg. The molar ratio of the casein to the gold was 0.407 when calculated from their inputs.

Comparative Example 5

A gold fine particle dispersed liquid was prepared in the same manner as in Example 1, except that the amount of the casein added was changed to 192.0 mg. The molar ratio of the casein to the gold was 0.509 when calculated from their inputs.

(Redispersibility Evaluation)

Regarding each of the noble metal fine particle dispersed liquids of Examples and Comparative Examples, the redispersibility of the noble metal fine particles was evaluated by the following method.

First, the average particle diameter of the noble metal fine particles (noble metal fine particles with casein adsorbed thereon) in the noble metal fine particle dispersed liquid immediately after being prepared was evaluated by using an apparatus for evaluating particle size distribution (FPAR-1000 manufactured by Otsuka Electronics Co., Ltd.). Next, a specified amount of 4.38 mol/l acetic acid was added to the noble metal fine particle dispersed liquid, and the pH of the resultant mixture was adjusted to the isoelectric point of casein (4.6). The mixture was stirred to aggregate the noble metal fine particles.

Subsequently, a noble metal fine particle aggregate was extracted from the noble metal fine particle dispersed liquid in which the noble metal fine particles were aggregated by a centrifuge separation method using a centrifugal separator (CN-1050, manufactured by Hsiangtai Machinery Industry Co., Ltd.). The noble metal fine particle aggregate was washed with pure water 3 times, and then it was dissolved in 3 mol/l aminoethanol (produced by Wako Pure Chemical Industries, Ltd.) and stirred for 30 minutes. Thereby, a noble metal fine particle redispersed liquid in which the noble metal fine particles were redispersed was prepared. The average particle diameter of the redispersed noble metal fine particles (the noble metal fine particles with casein adsorbed thereon) was evaluated by using the above-mentioned apparatus for evaluating particle size distribution, and the change ratio of the average particle diameter of the redispersed noble metal fine particles with respect to the average particle diameter of the noble metal fine particles with casein adsorbed thereon in the noble metal fine particle dispersed liquid immediately after being prepared (average particle diameter of redispersed noble metal fine particles with casein adsorbed thereon/average particle diameter of noble metal fine particles with casein adsorbed thereon before being redispersed (average particle diameter of noble metal fine particles with casein adsorbed thereon immediately after being prepared)) was calculated. The above-mentioned apparatus for evaluating particle size distribution is an apparatus for measuring particle size distribution by a dynamic light scattering method. The average particle diameters above were obtained by observing the fluctuation in scattered light intensity of the noble metal fine particles with casein adsorbed thereon, and calculating, based on Contin method, with a software in the above-mentioned apparatus using an autocorrelation function corresponding to the above-mentioned fluctuation determined by a photon correlation method. Table 1 shows the results thereof.

(Evaluation on Amount of Casein Adsorbed, with Respect to Total Weight of Noble Metal Fine Particles and Casein)

The noble metal fine particle aggregate aggregated because of the addition of acetic acid was kept in the atmospheric at 110° C. for 2 hours and dried to remove the solvent portion. Thereafter, the resultant was subject to a thermogravimetric analysis in an inert atmosphere, and the amount of the casein adsorbed was calculated from the weight change. Table 1 shows the results thereof.

TABLE 1

|  | Casein/noble metal (molar ratio) | Average particle diameter (nm) of noble metal fine particles with casein adsorbed thereon immediately after being prepared r1 | Average particle diameter (nm) of redispersed noble metal fine particles with casein adsorbed thereon r2 | Change ratio of average particle diameter (r2/r1) | Amount of casein adsorbed (wt %) |
|---|---|---|---|---|---|
| Example 1 | 0.010 | 33.9 | 36.3 | 1.1 | 3.0 |
| Example 2 | 0.017 | 34.8 | 34.9 | 1.0 | 4.2 |
| Example 3 | 0.051 | 32.1 | 29.6 | 0.9 | 12.1 |
| Example 4 | 0.102 | 40.7 | 43.3 | 1.1 | 23.1 |
| Example 5 | 0.153 | 42.2 | 38.8 | 0.9 | 34.2 |
| Example 6 | 0.254 | 35.9 | 39.5 | 1.1 | 55.1 |
| Example 7 | 0.100 | 35.5 | 37.6 | 1.1 | 17.0 |
| Example 8 | 0.130 | 45.3 | 49.2 | 1.1 | 39.7 |
| C. Example 1 | 0.005 | 75.3 | 119.8 | 1.6 | 1.8 |
| C. Example 2 | 0.008 | 36.4 | 52.8 | 1.5 | 2.2 |
| C. Example 3 | 0.305 | 40.1 | 79.3 | 2.0 | 60.0 |
| C. Example 4 | 0.407 | 45.6 | 76.0 | 1.7 | 70.3 |
| C. Example 5 | 0.509 | 54.4 | 107.2 | 2.0 | 78.8 |

In Examples 1 to 8, the ratio (change ratio) of the average particle diameter between before and after the redispersion treatment was in a range of 0.9 to 1.1 and the average particle diameter hardly changed therebetween. That is, it was found that the noble metal fine particles of Examples 1 to 8 exhibited excellent redispersibility. The amount of the casein adsorbed on the colloids (noble metal fine particles) was in a range of 3 to 55.1 wt % with respect to the total weight of the noble metal fine particles (aggregate) and the proteins (casein). Conceivably, the noble metal fine particles have high redispersibility when the amount of the casein adsorbed thereon is within this range.

In contrast, the average particle diameter after the redispersion treatment was increased significantly in Comparative Examples 1 to 5.

INDUSTRIAL APPLICABILITY

The present invention has a utility value in technical fields in which it is highly necessary to withdraw noble metal fine particle and reuse it in a coating material, a conductive paste, etc.

The invention claimed is:

1. A method for withdrawing a plurality of fine particles, each fine particle comprising a noble metal fine particle, and a protein adsorbed on a surface of the noble metal fine particle, the method comprising the steps of:
adjusting pH of a noble metal fine particle dispersed liquid that contains a first dispersion medium that is a liquid, and a plurality of fine particles, each fine particle comprising a noble metal fine particle, and a protein adsorbed on a surface of the noble metal fine particle, to an isoelectric point of the protein so that the plurality of the fine particles is aggregated in the first dispersion medium, wherein the isoelectric point of the protein is in a range of pH 4.0 to 7.5, and an amount of the protein adsorbed is in a range of 3 to 55.1 wt % with respect to a total weight of the noble metal fine particle and the protein, and the liquid contains no degrading enzyme that degrades the protein; and
withdrawing the plurality of the fine particles from the first dispersion medium by a solid-liquid separation operation.

2. A method for producing a noble metal fine particle dispersed material containing a plurality of fine particles, each fine particle comprising a noble metal fine particle, and a protein adsorbed on a surface of the noble metal fine particle, the method comprising the steps of:
withdrawing a plurality of fine particles by the method according to claim 1; and
dispersing the plurality of the fine particles in a second dispersion medium.

3. A method for producing a noble metal fine particle dispersed material containing a plurality of fine particles, each fine particle comprising a noble metal fine particle, and a protein adsorbed on a surface of the noble metal fine particle, the method comprising the steps of:
adjusting pH of a noble metal fine particle dispersed liquid that contains a first dispersion medium that is a liquid, and a plurality of fine particles, each fine particle comprising a noble metal fine particle, and a protein adsorbed on a surface of the noble metal fine particle, to an isoelectric point of the protein so that the plurality of the fine particles is aggregated in the first dispersion medium, wherein the isoelectric point of the protein is in a range of pH 4.0 to 7.5, and an amount of the protein adsorbed is in a range of 3 to 55.1 wt % with respect to a total weight of the noble metal fine particle and the protein, and the plurality of the fine particles has an average particle diameter of R, and the liquid contains no degrading enzyme that degrades the protein;

withdrawing the plurality of the fine particles from the first dispersion medium by a solid-liquid separation operation; and dispersing the plurality of the fine particles in a second dispersion medium so as to prepare a noble metal fine particle dispersed material in which a plurality of fine particles having an average particle diameter of 0.9 R or more and 1.1 R or less is dispersed.

* * * * *